United States Patent
Bernardin et al.

(10) Patent No.: US 7,870,568 B2
(45) Date of Patent: Jan. 11, 2011

(54) ADAPTIVE SHARED COMPUTING INFRASTRUCTURE FOR APPLICATION SERVER-BASED DEPLOYMENTS

(75) Inventors: James Bernardin, New York, NY (US); Alexander Iskold, Livingston, NJ (US)

(73) Assignee: DataSynapse, Inc., New York, NY (US)

( * ) Notice: Subject to any disclaimer, the term of this patent is extended or adjusted under 35 U.S.C. 154(b) by 972 days.

(21) Appl. No.: 11/395,586

(22) Filed: Mar. 30, 2006

(65) Prior Publication Data

US 2006/0277305 A1 Dec. 7, 2006

Related U.S. Application Data

(60) Provisional application No. 60/688,418, filed on Jun. 7, 2005.

(51) Int. Cl.
G06F 9/44 (2006.01)
G06F 15/16 (2006.01)
G06F 15/173 (2006.01)

(52) U.S. Cl. ............ 719/328; 709/202; 709/203; 709/226

(58) Field of Classification Search ......... 709/202; 705/35, 1; 710/242; 719/319
See application file for complete search history.

(56) References Cited

U.S. PATENT DOCUMENTS

| | | | |
|---|---|---|---|
| 2003/0191795 A1 | 10/2003 | Bernardin et al. | |
| 2005/0021594 A1 | 1/2005 | Bernardin et al. | |
| 2005/0038829 A1* | 2/2005 | Chidambaran et al. | 707/200 |
| 2005/0065994 A1* | 3/2005 | Creamer et al. | 709/202 |
| 2005/0080696 A1* | 4/2005 | Bagchi et al. | 705/35 |
| 2006/0143350 A1* | 6/2006 | Miloushev et al. | 710/242 |
| 2007/0112574 A1* | 5/2007 | Greene | 705/1 |

OTHER PUBLICATIONS

David Maples, GSAW2004 Grid and Web Service Standards, Mar. 4, 2004, DataSynapse, pp. 1-65.*
Luis Ferreira et al., Introduction to Grid Computing with Globus, Sep. 2003, IBM, pp. 1-296.*
Johnson, R. Introduction to the Spring Framework, 2005 (http://www.theserverside.com/articles/content/SpringFramework/article.html).
Barker, M.; Rajkumar, B.; Laforenza, D.; Grids and Grid Technologies for Wide-Area Distributed Computing; Softw. Pract. Exper. 2002.
Jospeh, R.; The Spring Operating System.

* cited by examiner

*Primary Examiner*—Lechi Truong
*Assistant Examiner*—Tuan Dao
(74) *Attorney, Agent, or Firm*—Leason Ellis LLP

(57) ABSTRACT

An adaptive system for dynamically provisioning a shared computing infrastructure among a plurality of software applications and a plurality of types of software application servers providing run-time environments for the software applications. The system includes computing engines assigned to execute instances of the software applications, clients accessing the computing engines to request and receive services from the software applications, and a broker device that dynamically allocates engines domains for executing the software applications. The broker device includes an optimization module for allocating the computing engines to the domains, and a configuration manager for configuring the engines. The configuration manager reconfigures a computing engine by halting a current instance of a first software application, and by loading and starting an instance of a second software application. The system is capable of reconfiguring software applications running in environments provided by different types of software application servers.

18 Claims, 17 Drawing Sheets

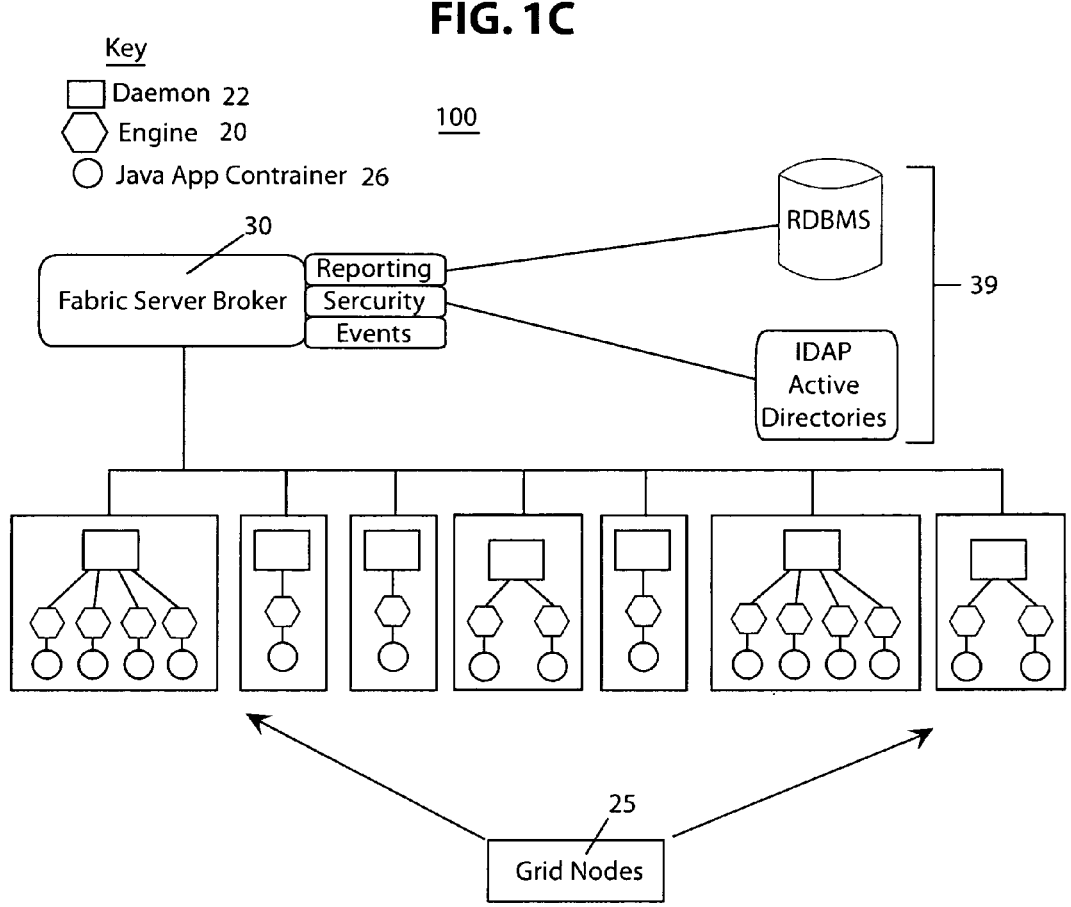
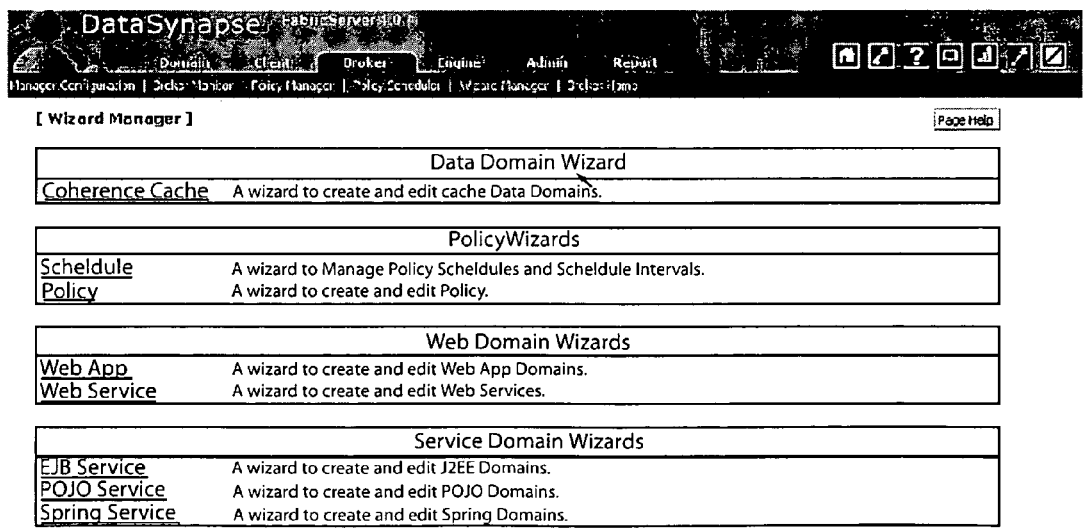

FIG. 4C

[ Containers ]

| Name | Version | Description | Supported Domain Types | Modified | Actions |
|---|---|---|---|---|---|
| Weblogic2 Container | 8.1 SP5 | Weblogic2 Container | Web App , Web Service | no | -- Actions -- |
| Default Container | 1.0 | Basic container provided by DataSynapse | POJO Service , Spring Service | no | -- Actions -- |
| Tomcat Container | 4.0 | Tomcat Container is the Fabric wrapper around Tomcat Application Server | Web App | no | -- Actions -- |
| Weblogic Container | 8.1 SP4 | Weblogic Container | Web App , Web Service | no | -- Actions -- |
| Resin Container | n/a | Resin Container | Web App | no | -- Actions -- |
| JBoss Container | 4.0.2 | JBoss Container is the Fabric wrapper around JBoss Application Server | EJB Service , Web App , Web Service | no | -- Actions -- |

FIG. 4D

[ Domain Wizard ]

Web App

I would like to:

- Add/edit Domain settings
- Add/remove archive files
- View servlet list
- View EJB list
- Add/edit tracked statistics
- Add/edit advanced settings
- Add/edit URL patterns
- Add/edit container-specific config files
- Add/edit container-specific runtime context variables

[ Close ] [ Previous ] [ Next ] [ Finish ]

[Policy Wizard]

| Policy |
|---|
| Add or edit Domain allocations |

[Add] [Edit] [Remove]

| Domain | Min | Max | Priority |
|---|---|---|---|
| GenericWebService Domain | 2 | 8 | 1 |
| ClusteredRubisDomain | 2 | 4 | 1 |
| ClusteredGeneric Domain | 1 | 3 | 1 |
| ClusteredIODomain | 2 | 3 | 1 |

[Cancel] [Previous] [Next] [Finish]

FIG. 9B

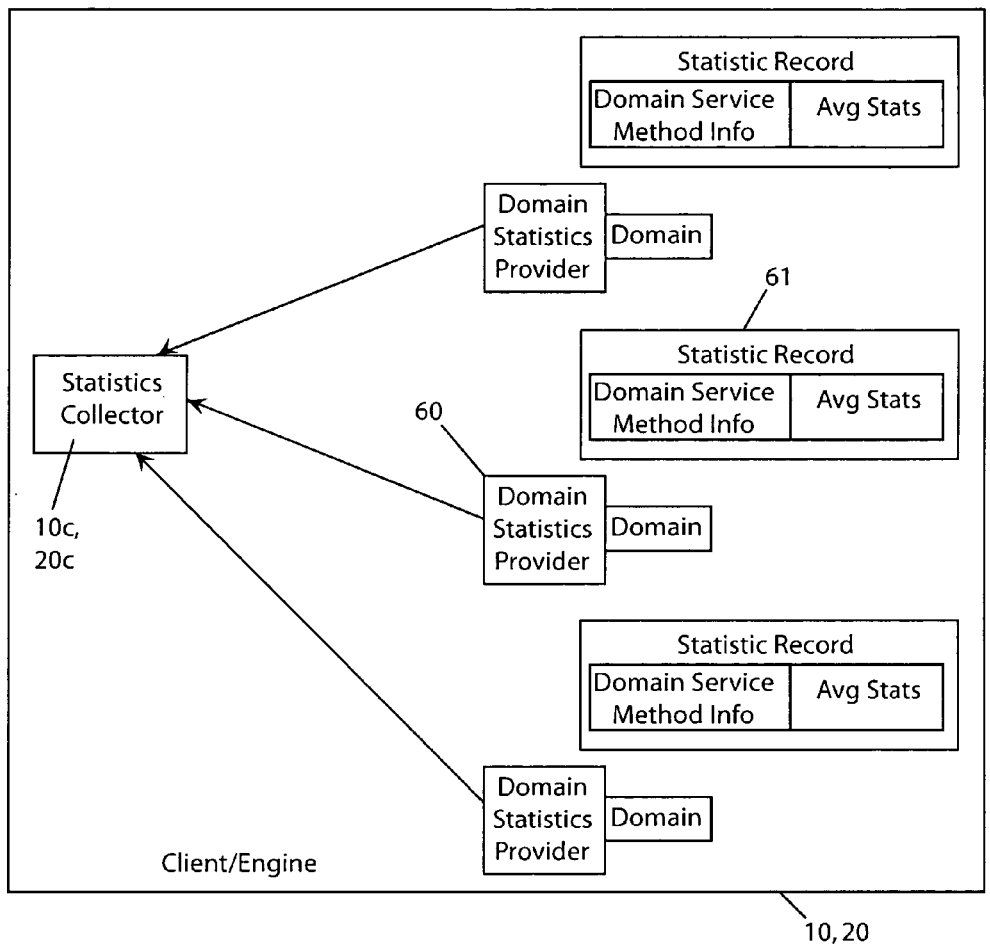

FIG. 9C

| Client | Engine | Client Grid | Engine Grid |
|---|---|---|---|
| Response time<br>Throughput<br>Time on the queue<br>Queue size<br>CPU Utilization<br>Disk size | Business method<br>time<br>Throughput<br>Memory<br>CPU Utilization<br>Disk size | Response time<br>Throughput<br>Time on the queue<br>Queue size<br>CPU Utilization<br>Number of clients | Business method time<br>Throughput<br>CPU Utilization<br>Number of engines |

FIG. 9D

| VGateway/VProxy | Domains |
|---|---|
| Response time<br>Throughput<br>Time on the queue<br>Queue size | JMX-attributes<br>Number of threads<br>Free Memory<br>CPU Utilization<br>Free Disk space |

FIG. 9E

[Engine Charts]

ADAPTIVE SHARED COMPUTING INFRASTRUCTURE FOR APPLICATION SERVER-BASED DEPLOYMENTS

CROSS-REFERENCE TO RELATED APPLICATIONS

The present application claims the benefit under 35 U.S.C. §119(e) of U.S. Provisional Application No. 60/688,418, filed on Jun. 7, 2005, which is hereby incorporated by reference in its entirety.

FIELD OF THE INVENTION

The present invention is directed to a system and method for dynamically allocating and provisioning shared computing resources in a distributed computing environment. More specifically, the present invention is directed to a system and method for dynamically allocating and provisioning shared computing resources among a plurality of different types of software applications in run-time environments provided by a plurality of different types of application servers.

BACKGROUND OF THE INVENTION

The global marketplace is forcing companies to respond quickly to dynamic market conditions while reducing costs. Businesses increasingly must have the ability to meet, or beat, competitors by introducing new and innovative products and services. These new offerings are often customer-facing and transaction-oriented, and introduce additional complexity and higher levels of volatility for the enterprise computing resources called upon to provision these products and services. Higher transaction volumes and demands for improved response times create an ever-increasing need for computing resources.

In a conventional enterprise computing environment, computing resources are usually manually assigned and provisioned to support various applications. This approach creates several problems. As the assigned resources are generally fixed at a point in time to meet a current demand level, the conventional enterprise computing environment is ill-equipped to adapt over time to meet increasing demand levels for some applications and decreasing demand levels for others. In order to meet minimum service requirements, computing resources are often assigned and provisioned according to peak-level demands. As a result, during periods of less than peak-level demands, computing resources are underutilized.

With the advent of grid computing, conventional enterprise computing environments have been adapted to "virtualize" applications so that computing resources may be dynamically provisioned to applications in response to current demand levels. For example, the GRIDSERVER Virtual Enterprise Edition adaptive grid infrastructure software available from DataSynapse, New York, N.Y. provides a computing operating environment that virtualizes application and data services, independent of specific system resources. Client applications submit service requests to the grid environment, and GRIDSERVER dynamically provisions services on specific system resources in the grid to meet the service requests. For example, requests from multiple client applications cause GRIDSERVER to create multiple service instances to handle the requests in parallel on different computing resource nodes in the computing resources grid. As a result, underutilization of resources can be substantially reduced, and service levels can be commensurately improved.

GRIDSERVER has been particularly effective at providing a virtualized computing environment that adapts to meet resource demands for computing-intensive processes. It would be of further benefit to develop a virtualized computing environment that effectively adapts to meet resource demands for high throughput, low latency transactional applications such as distributed web applications and other services-based application. In addition, it would be of further benefit to develop a virtualized computing environment that adaptively provisions computing resources for web and other services-based applications supported by a variety of different types of application servers.

SUMMARY OF THE INVENTION

The present invention is directed to a system and method for adaptively provisioning a shared computing infrastructure to support a plurality of software applications and a plurality of types of application servers each providing a run-time environment for one or more of the software applications. The system includes computing engines assigned to execute instances of the plurality of software applications, clients accessing the computing engines to request and receive services from the software applications, and a broker that dynamically allocates computing engines to the clients for executing the software applications.

The broker includes an optimization module for periodically determining an optimal allocation of the computing engines to the software applications and application server. To reallocate resources based on an optimal allocation, the broker device also includes a configuration manager for reconfiguring a computing engine by halting a current instance of a software application of a first type, and for loading and starting an instance of a software application of a second type, where the software application of the first type and the software application of the second type may be configured to operate in run-time environments created by different types of software application servers. In such a heterogeneous computing environment, the broker is fully flexible to allocate software applications supported by a variety of types of application servers.

For web applications, for example, where the client is simply a web browser or other http client seeking to connect to a web application or web service, the system may further include a router or "virtual gateway" for alternatingly routing requests among the computing engines, for example, so that at least one of the number of service requests per engine and the service load per engine are balanced across the engines. A monitor of the broker periodically collects statistical information from one or more of the engines, the clients and the router. The statistical information is used then used by the broker together with a usage policy to determine the optimal resource allocation.

In addition, the broker device includes a software distribution module for retrieving components of the software applications and application server from an archival database so that these components may be distributed to and loaded on the engines.

BRIEF DESCRIPTION OF THE DRAWINGS

The foregoing and other features of the present invention will be more readily apparent from the following detailed description and drawings of illustrative embodiments of the invention wherein like reference numbers refer to similar elements throughout the several views and in which:

FIG. 1C provides a schematic diagram illustrating a third view of the architecture for the present invention;

FIGS. 2, 3A and 3B illustrate exemplary web pages produced by an administrative tool used in conjunction with the present invention;

FIG. 4C illustrates an exemplary web page of a domain wizard of the administrative interface that identifies container types;

FIG. 4D illustrates an exemplary web page of the domain wizard for creating or editing a web application domain

FIG. 9B provides a schematic diagram illustrating how performance statistics are collected by a client or engine;

FIGS. 9C and 9D provide a sample lists of the statistics compiled by the broker in FIG. 9A;

FIG. 9E illustrates an exemplary "dashboard" web page of the administrative tool;

DETAILED DESCRIPTION OF THE INVENTION

Figure 1A:
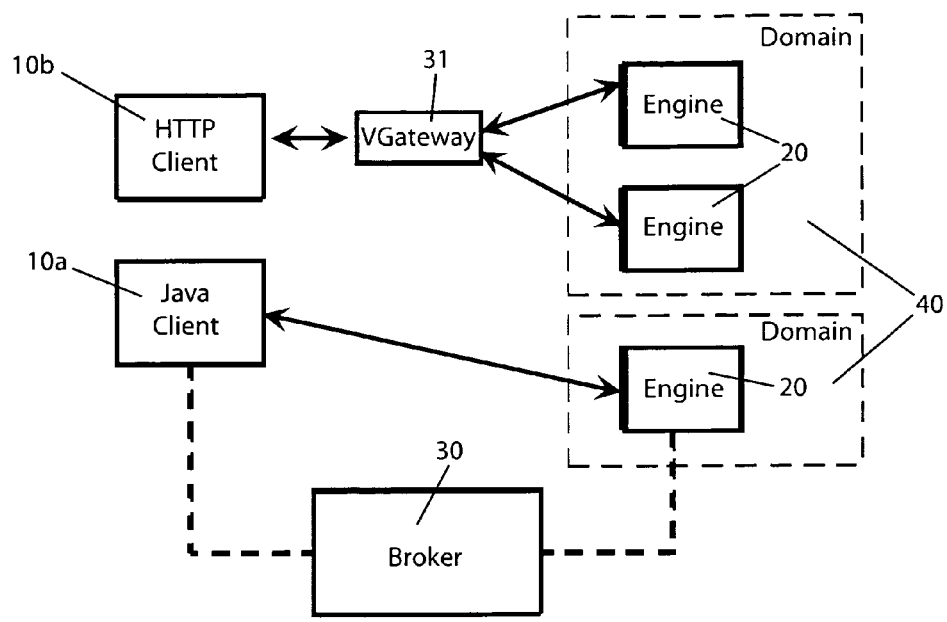
FIG. 1A provides a schematic diagram illustrating an architecture for the present invention.

The present invention is directed to an application virtualization and provisioning (AVP) platform that creates a highly adaptive shared computing infrastructure. Within this infrastructure, application servers and other service-oriented components are hosted and virtualized on shared computing resources, and are adaptively provisioned and activated in response to demand. The shared computing resources may be geographically localized, or may be distributed over a wide geographic area and managed as a computing grid. See Mark Baker et al., *Grids and Grid technologies for wide-are distributed computing*," Softw. Pract. Exper., John Wiley & Sons, Ltd., 2002, which is hereby incorporated by reference.

Application virtualization enables the removal of static, host-specific configuration dependence from the application environment by using the AVP platform to automatically and adaptively allocate, configure, start, deploy, monitor and manage software applications and services. Explicit usage policies are defined that guide provisioning and dynamic allocation of the shared computing resources The configuration of software applications and services is in particular enabled by a broker component of the AVP platform that stores application server, configurations and software applications in a central repository for deployment to the shared computing resources as required according to the resource allocation, and manages the allocation of the shared computing resources based on the usage policies. This component also includes a facility for deploying new application code to the shared computing resources while existing applications are running in the currently-allocated configurations.

The AVP platform is directed to managing "domains," which may comprise an enterprise business application, utility service or data source that is allowed a certain percentage of available resources at a specified time, based on the usage policy. Domains consist of the artifacts that make up the application, service or data source (e.g., web archive (WAR) files making up a web application), and may be classified among three domain types: service domains, data domains and web domains.

Service domains are used to virtualize Java programming objects, including plain old Java objects (POJOs), Spring Beans and Enterprise Java Beans (EJBs), by turning them into services. These virtualized services may then be accessed by Java clients via dynamic proxies.

Data domains provide data services such as databases or scalable caching services. Data domains may preferably be implemented, for example, as JBOSS cache and TANGOSOL's COHERENCE cache.

Web domains provide web applications and services such as web servers, messaging brokers, message-driven services and other services that typically require multiple running instances at any given point in time. Web domains include collections of application services that are accessible over the Internet via communications based on the hypertext transfer protocol (http).

Domains can be launched or hosted on one or more application servers (or "containers"). Containers are effectively "sandboxes" for hosting the domains. Each container type is capable of hosting one or more domain type, and a given domain can be launched by any container that supports its type. For example, a JBOSS container can host web application, web service and EJB service domains. Other container types may include but are not necessarily limited to APACHE TOMCAT containers, CAUCHO RESIN containers, IBM WEBLOGIC containers, and other generic containers supported by the AVP platform.

A service-level policy, or consistent set of rules, is applied to dictate the operation and division of computing resources. The service-level policy may be defined for example by software application and/or by user group, and may be conditioned on certain performance requirements including but not necessarily limited to response time, throughput and minimum/maximum allocation of computing resources ("percentage of grid"). In accordance with the defined service-level policy, the AVP platform operates to provision and activate services according to demand for improved performance and utilization of resources.

A system-level architecture for the AVP platform 100 is illustrated in FIG. 1A. The architecture includes four fundamental elements: clients 10, engines 20 associated with domains 40, and a broker 30. Clients 10a and 10b are software applications that access and utilize the domains 40. Engines 20 are processes that provision and run software applications in the domains 40. The broker 30 is a software application that carries out policy-driven resource allocation (e.g., allocation of engines 20 to domains 40 and clients 10a) and performance monitoring. Each of the clients 10a, engines 20 and broker 30 may be implemented on conventional INTEL and/or SUN/SPARC hardware platforms running, for example, WINDOWS, WINDOWS SERVER, SOLARIS, RED HAT Linux or RED HAT Enterprise Linux operating systems As illustrated in FIG. 1A, clients 10a and engines 30 both interact with the broker 30. The broker 30 assigns domains 40 to engines 20, and provides information for example to JAVA clients 10a that instructs the clients how to access to the engines 20. Thereafter, JAVA clients 10a are able to submit service requests directly to the connected engines 20. Http clients 10b submit service requests via a router ("Vgateway 31"), which acts as a virtual gateway and load balancer for directing the service requests to engines 20 running web service or web application domains.

Figure 1B:
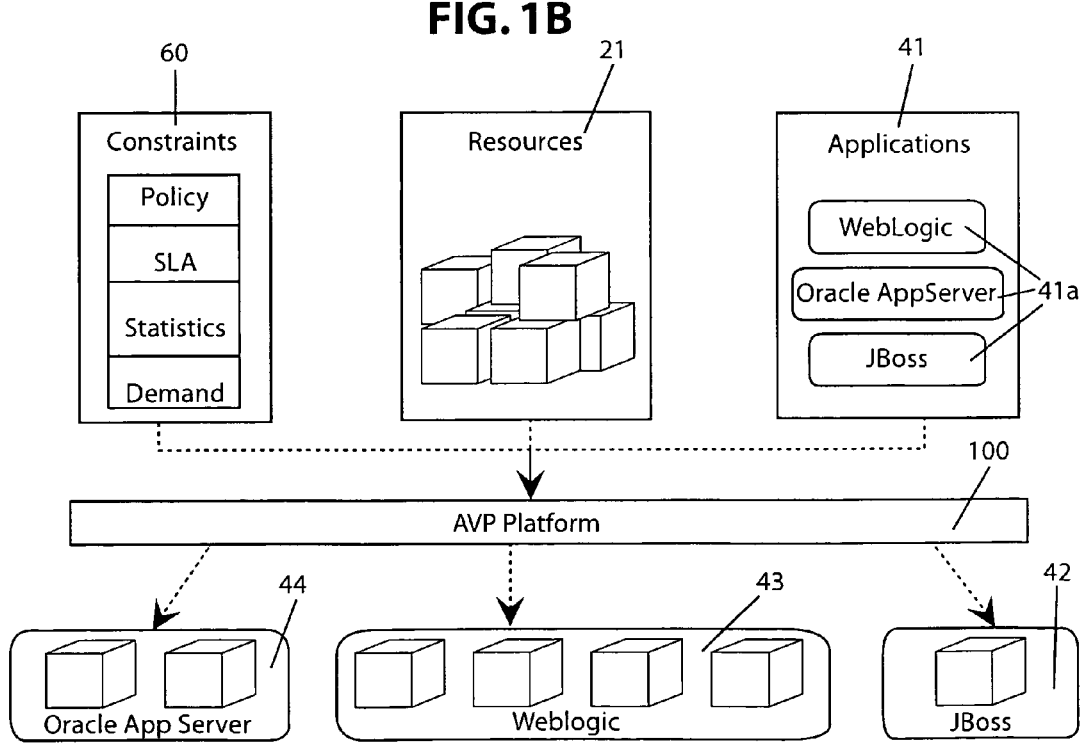
FIG. 1B provides a schematic diagram illustrating an alternate view of architecture for the present invention.

FIG. 1B illustrates an alternate view of the architecture for the AVP platform 100. AVP platform 100 dynamically assigns and provisions computing resources 21 among software applications 41 supported by application servers 41a by configuring domains 42, 43 and 44. AVP platform 100 optimizes the assignment of resources 21 among the applications 41 subject to constraints 60 which may include, for example, service-level policies associated with the domains 42, 43, 44, and/or with user groups seeking access to the domains, service level agreements ("SLAs") associated with the domains 42, 43, 44 and or user groups, performance statistics periodically collected from engines, clients and other components of the AVP platform 100, and service demands predicted from the usage statistics.

FIG. 1C illustrates a third view of the architecture for the AVP platform 100. Computing resources are represented by grid nodes 25, which may each include one or more host computers. Broker 30 allocates and configures one or more engines 20 to run on each of the grid nodes 25. Each engine 20 manages a container 26 that serves as an environment for running an application, service or data source, and preferably collects and reports performance statistics for the application, service or data source (for example, by Java Management Extension (JMX) proxy for Java 2 Platform, Enterprise Edition (J2EE) applications), and preferably binds with a container software development kit (SDK) within an administrative interface (not shown) that may be used to configure the containers 26.

Broker 30 also configures a daemon 22 that runs on each host computer in each grid node 26 that monitors the host, manages the engines 22 that are running on the host, and deploys binary code provided by the broker 30 for running a container (or application server) 26 and/or an application, service or data source to be run by the container 26. In addition, broker 30 collects performance statistics provided by the engines 20 (and/or by clients 10a and Vgateway 31) for storage in a database 39, for reporting and/or as inputs to the allocation optimization. Broker 30 may also provide failover services for reallocating an application, service or data source from a failed host computer to an operating host computer.

AVP platform 100 of FIGS. 1A, 1B and 1C further includes an administrative interface (not shown) of the broker 30 that enables a platform administrator to define, register and deploy domains, to manage workloads and to configure the AVP platform environment. By way of example, FIG. 2 illustrates a broker web page of the administrative interface that provides access to a variety of wizards available for creating data, web and service domains, and for establishing policy.

Figure 3A:
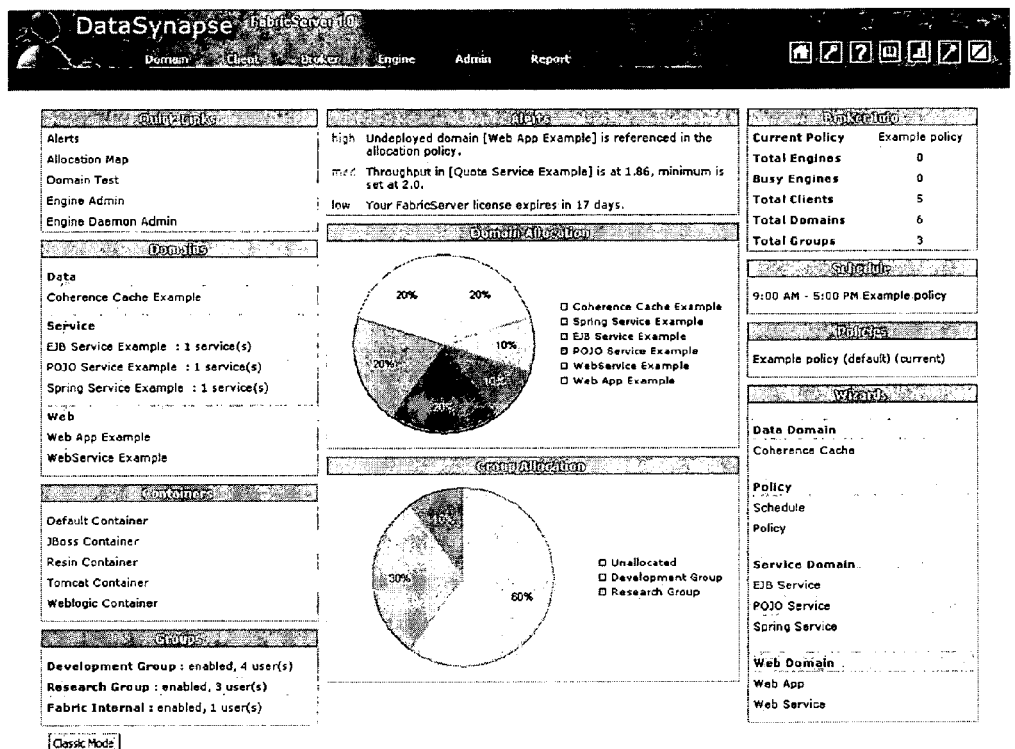
Figure 3B:
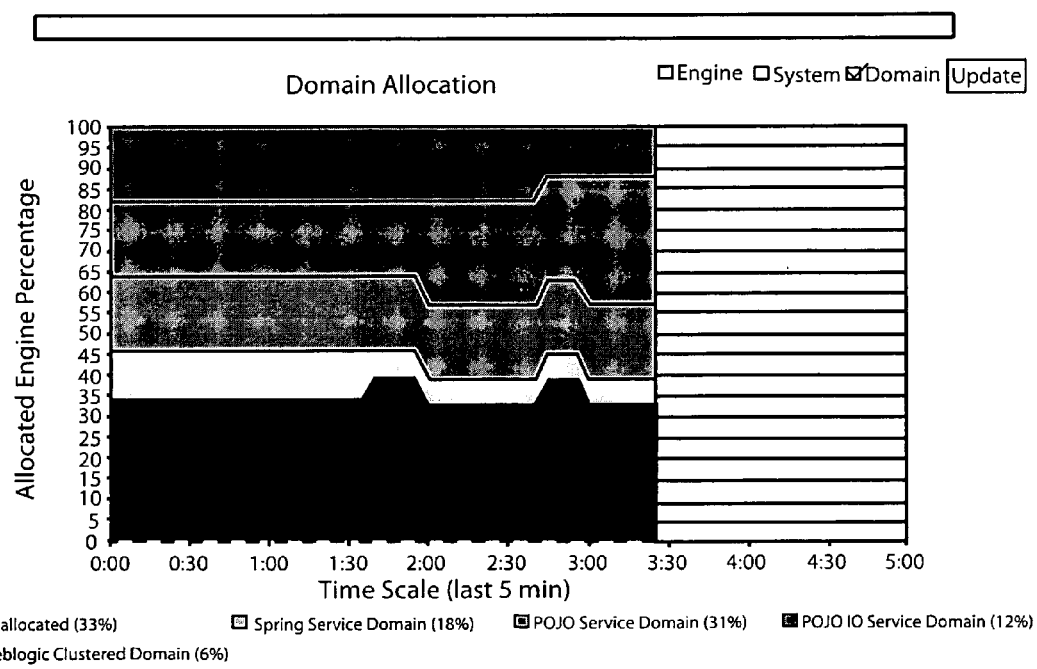

In addition, the administrative interface allows the platform administrator to monitor and manage various performance metrics, including but not necessarily limited to throughput, latency, resource usage, and exceptions. For example, FIG. 3A illustrates a "dashboard" page of the administrative interface that provides a pie chart indicating a current allocation of resources among domains, and FIG. 3B illustrates a "broker monitor" page of the administrative interface that graphs the allocation of resources among domains over time.

Domains

Figure 4A:
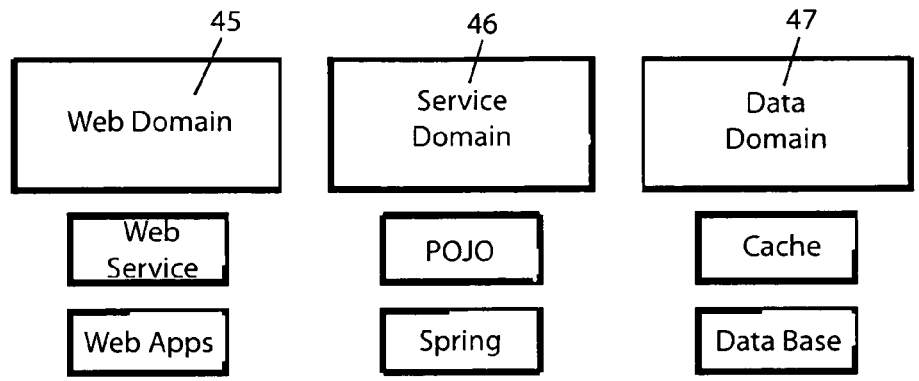
FIG. 4A provides a schematic diagram illustrating domain types supported by the present invention.

As illustrated in FIG. 4A, the AVP platform 100 is directed to manage three types of domains: service domains 45, web domains 46 and data domains 47.

Web Domains

Web domains 45 provide web applications and services, for example, including web servers, messaging brokers, message-driven services and other services that typically require multiple running instances. Web domains represent any collection of application services that are accessible via http, and can effectively represent any object or process that can be started, stopped and interrogated for its current load. Types of web domains include web applications accessible via a browser, and web services made available via simple object access protocol (SOAP) over http.

Web domains are preferably targeted for J2EE application servers. For example, an existing J2EE application may be represented as a web service, with an application cluster size varying between 2 and 5 nodes, base on policy. The physical locations of the web domain instances are decided by the AVP platform 100 at runtime, and the resources are provisioned dynamically. The AVP platform 100 then instantiates each domain on one or more grid nodes. The policy that dictates how many instances are created, and at what time they are created, are dictated by a service-level policy that is maintained by the broker 30.

Figure 4B:
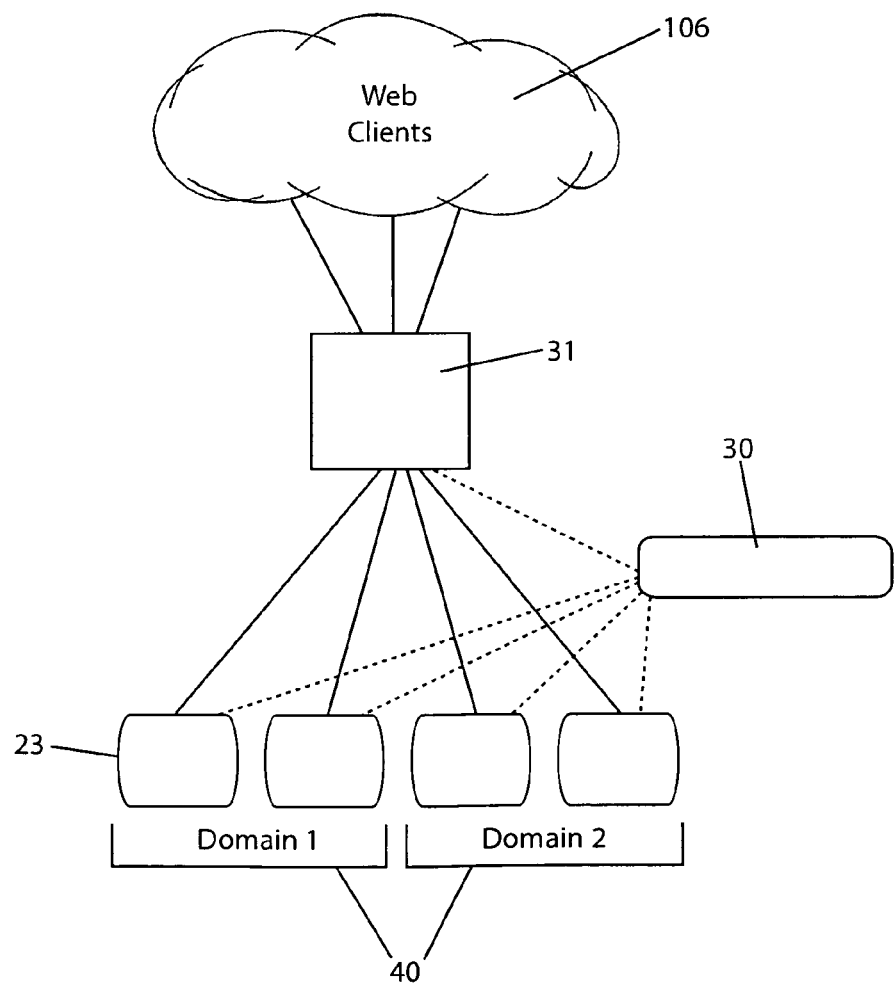
FIG. 4B illustrates a virtual gateway for balancing traffic for web applications and services.

As illustrated in FIGS. 1A and 4B, web clients 10b may preferably access web domains 40 via a virtual gateway router (Vgateway 31). VGateway 31 is preferably implemented as part of the broker 30, and functions essentially as a smart load balancer, routing web service requests and responses from external clients to resource virtualized engines. Unlike conventional static load balancers, Vgateway 31 is informed when the configuration of host computers 23 and/or domains 40 changes, and adjusts its load balancing scheme accordingly.

Service Domains

Service domains 46 include a collection of interfaces that can be virtualized across distributed computing resources ("grid resources"). By grouping these resources within a service domain, specific policies can be set to determine how many resources each service domain will be allowed to consume. JAVA-based service domains 45 may be defined, for example, using J2EE, plain old JAVA objects ("POJOs") or the Spring framework Service domains 45 may be used, for example, to define any standard JAVA class or Enterprise Java Bean (EJB). No proprietary application programming interface (API) or class format is required to virtualize the associated Java service. For example, POJOs can be defined with application context, or the complete and necessary environment for making the associated Java object instance work correctly. For example, a JAVA class that represents a business service would be defined with access to database connections and messaging services in order to perform the required processing. Preferably, a simple Extensible Markup Language (XML) format is provided for declaring the proper context for each object.

Among supported service domain types, the POJO domain type is the simplest to construct. Any JAVA class can be included in a POJO service domain. In addition, a Spring service domain type may preferably be supported. See Rod Johnson, *Introduction to the Spring* Framework, May 2005, available at www.theserverside.com/articles/article.tss?l=SpringFramework, which is hereby incorporated by reference. The Spring framework simplifies J2EE development by using POJOs instead of EJBs, and allowing for the abstraction and encapsulation of implementation dependent components (for example, Hibernate and JDBC mapping tools). In addition, this framework allows for dynamic proxy-based aspect oriented programming (AOP). AOP is a programming facility that allows developers the ability to inject logging, transaction, security and transaction capabilities across modules and components. The Spring framework also uses AOP to provided declarative transaction management for POJOS. For legacy components that are packaged as EJBs, an EJB service domain allows for virtualized access to EJB functionality.

Data Domains

Data domains 47 of FIG. 4A provide data services such as databases or scalable caching services. These services are essentially clientless, as no gateway or proxy to the services in provided via the broker. Instead, the AVP platform may provide a centralized lookup, for example, such as a Java Naming and Directory Interface (JNDI) that allows clients to discover and connect to these domains.

Creating Domains

According to the principles of the present invention, domains are launched or hosted on one or more application server, or containers. Each container type is capable of hosting one or more domain types, and a given domain can be launched by any container that supports its type. FIG. 4C provides an exemplary listing of container types supported by a domain wizard of the administrative interface. For example, a JBOSS container can support web application, web service and EJB service domains. Other container types include but are not limited to APACHE TOMCAT containers, CAUCHO RESIN containers, IBM WEBLOGIC containers, and other generic containers supported by the AVP platform. The administrative interface preferably includes a container software development kit (SDK) enabling the addition of additional container types as required.

Domains may be created for example by means of a domain wizard within the administrative interface. FIG. 4D illustrates an exemplary web page of the domain wizard for creating or editing a web application domain that deploys a specified web application. As illustrated in FIG. 4D, the web application domain may be newly created or modified by selecting and specifying an appropriate container, and by specifying domain settings, associated archive files (for example, JAVA archive (JAR), Enterprise archive (EAR) or web archive (WAR) files), servlets and Enterprise JAVABEANS (EJBs). In addition, tracked statistics for associated service-level policies may be specified. For web applications and web services, URL patterns to be used by the Vgateway 31 of FIG. 1A may also be specified.

Policy and Resource Allocation

The broker 30 of FIG. 1A is configured with a service-level policy that provides a consistent set of rules for the assignment and allocation of computing resources from the resource grid. This policy enables the broker 30 to select a resource allocation among the domains. In the absence of this policy, the broker may operate to assign an equal percentage of grid resources to each of the domains.

The service-level policy defines a hierarchical, constraint-based division of computing resources in the grid. For example, a first level of partitioning may be by domain, followed by a second level of partitioning by user group. Additional and/or alternate partitioning criteria may be arbitrarily selected (for example, partitioning by work project), all of which are fully contemplated within the scope of the present invention.

The service-level policy will generally define a minimum number and maximum engines that should be allocated for each domain, either in terms of a number of engines or a percentage of available engines. A "minimum allocation percent" specifies a least amount of resource always held by an associated domain. If no clients are running, the rule may be excepted in order to make resources available to other grid clients (the "minimum allocation percent" is set to zero, so that no resources are assigned unless no other clients are running). However, these resources are relinquished as soon as a non-running client starts up. If the minimum allocation percents for grid clients do not sum to 100%, and all types of grid clients are active, the broker may continuously redistribute resources to optimize service-level agreements (SLAs) for the grid clients or domain.

Figures 5A, 5B:
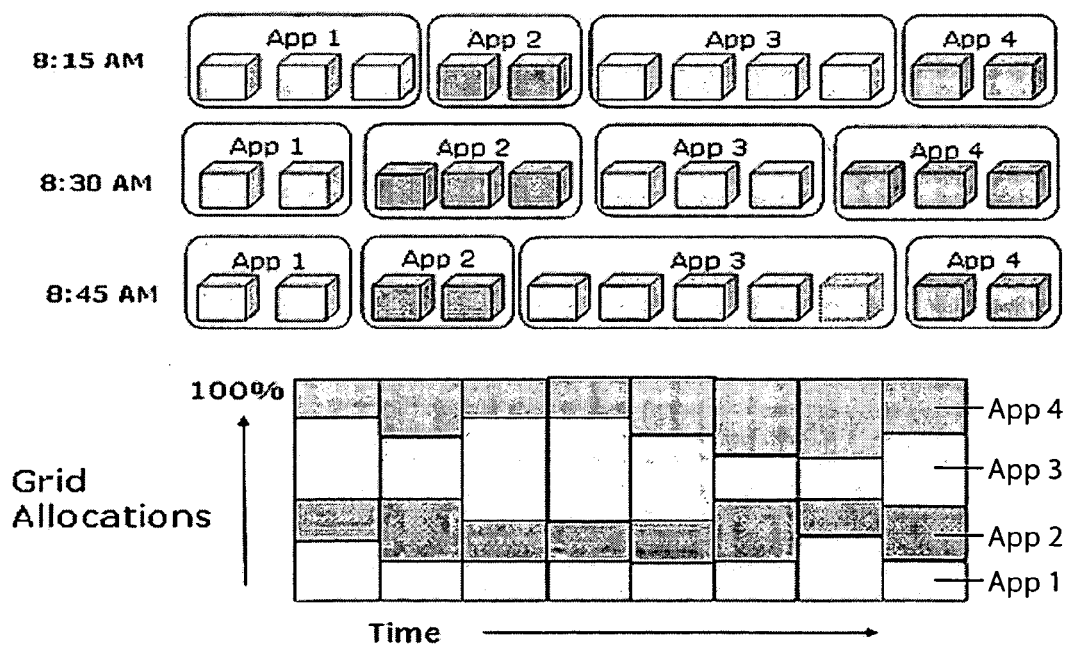
FIG. 5A illustrates an exemplary policy editor page of the administrative tool of FIG. 2 for setting minimum and maximum values for engine allocations to domains and groups.
FIG. 5B provides an example of time-of-day dependent grid allocations as controlled by a policy of the present invention.

A "maximum allocation percent" specifies a cap on the amount of resources to be given to an associated domain. This maximum is preferably enforced even if idle resources are available. As illustrated in FIG. 5A, the administrative interface preferably provides an editor for editing the minimum and maximum engine allocations for domains.

The broker may in addition apply a policy schedule that indicates how policies are to be applied over the course of a day. As illustrated for example in FIG. 5B, the grid resources assigned to a domain 48 for an application varies with time. Domain 48a at 8:15 AM is allocated four computing engines 20 from the grid. At 8:30 AM, the number of allocated engines in domain 48b is reduced to three engines 20. At 8:45 AM, the number of engines allocated to domain 48c is increased to five engines 20. Domains may also be assigned priority weights which indicate how resources are to be divided when there is resource contention.

Figure 5C:
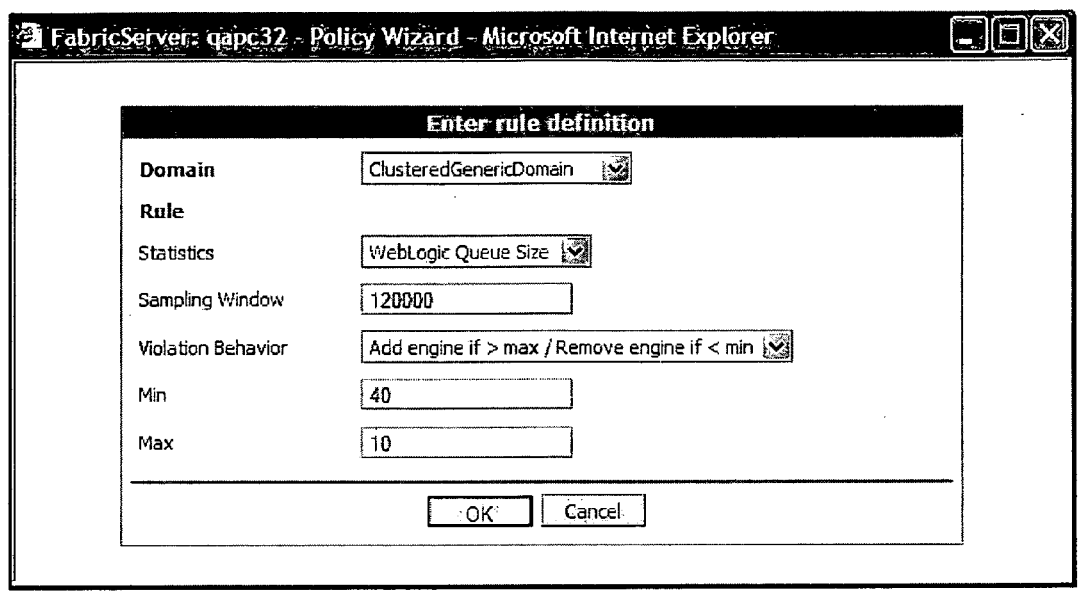
FIG. 5C illustrates an exemplary policy wizard web page that may be used to set performance-based resource allocation constraints.

Once the minimum and maximum number of engines is established, the broker 30 proceeds to provision resources to a minimum level. The broker 30 may choose to allocate more than the minimum number of engines to a domain if there is a statistical rule that can be used to understand the performance of the application. For example, if queue size can be measured as an indication of current load on the application, a rule can be established for adding an additional engine when the average queue size for all engines in the domain over a specified time interval exceeds a specified level. In addition, a rule for relinquishing an engine can be established based on the average queue size falling below a specified level over the specified time period. FIG. 5C illustrates a policy wizard web page of the administrative interface that may be used foe setting statistical rule-based constraints.

Figure 5D:
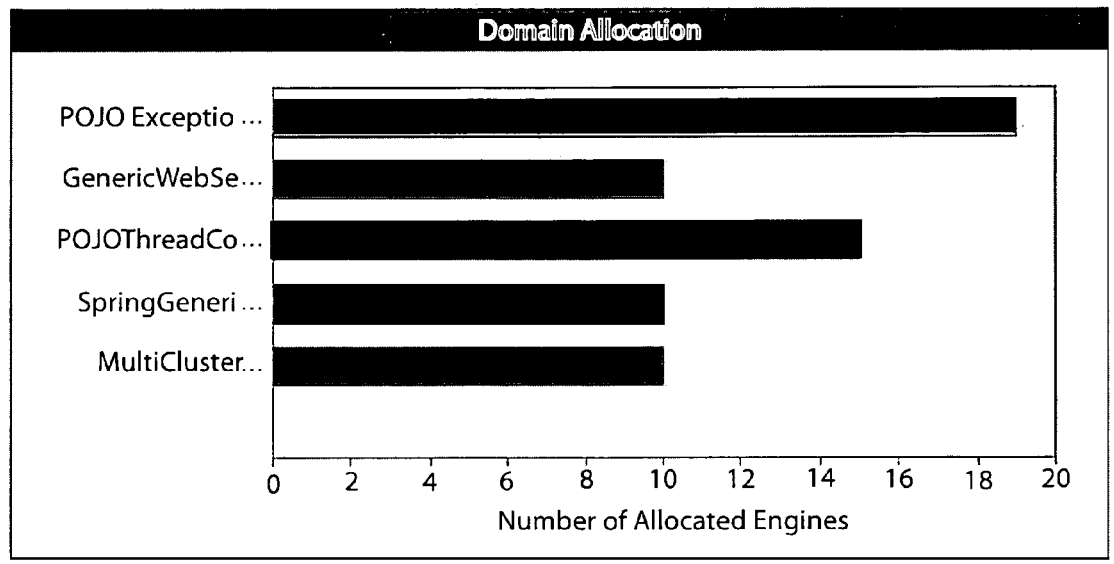
FIG. 5D provides an example distribution of engines allocated to operating domains.

The broker 30 allocates engines (or application server instances) to domains based on a current active policy and current application performance statistics. The broker reevaluates and reapplies this policy periodically (for example, every 5 minutes), and then decides to take one of three courses of action: a) to make no change in the current allocation, b) to assign available engines to some domains, or c) to re-assign some engines from some domains to other domains. FIG. 5D illustrates an allocation of engines across domains.

Engines

Figure 6A:
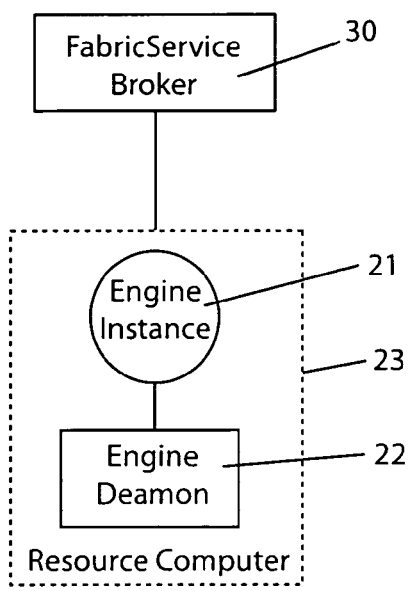
FIG. 6A provides a schematic diagram illustrating elements of an engine component of the present invention.

As illustrated in FIGS. 1C and 6A, each engine in the AVP platform 100 manages a container 30 to host and run a domain. Further, as illustrated for example in FIG. 6A, an engine service instance 21 is managed by an engine daemon 22, both installed on a host computer 23.

Engines create service instances on demand, based on scheduling decisions made by the broker. A service is created with the first client request for an operation having the created service type. After creating and running the requested operation, the engine stores the newly-created service in a cache. A scheduler is made aware of the contents of the cache, such that it will route other requests for that service to the engine.

By default, engines operate as single-threaded processes ("engine instances") performing only one service operation at a given time. As a result, more than one engine instance 21 is generally running at one time on the host computer 23. Processes running on multiple engine instances are started and managed by an agent that also runs on the host (engine daemon 22).

Engine daemon 22 is capable of starting and stopping engines based on a pre-defined engine policy. Engine policies may for example be based on one or more of CPU utilization of the host, user activity (in the case that the host is a user's desktop) or time of day. In most cases, the engine daemon 22 starts and monitors engine instances 21, and restarts the engine instances 21 in response to failures or reconfigurations.

One engine daemon 22 runs per host. In addition to starting engine instances 21, the engine daemon 22 preferably controls the configuration of engine instances 21. For example, when changes to an engine configuration are made by a platform administrator (for example, to configure a new application server), the changes may be automatically propagated to an engine instance 21 via the engine daemon 22. Engine daemons 22 may log into the broker 30 for administration and configuration.

Engine instances 21 are the processes that perform tasks for executing application software in the domain. On multi-CPU hosts, an engine daemon 22 will be able to run multiple engine instances 21. In addition, more than one engine instance 21 may be run on a single CPU.

Engines 20 report to the broker 30 when they are available to perform work. After logging in and synchronizing resources, the engines accept work assignments, perform tasks for executing the applications software, and notify the broker 30 when results are ready. Because the engine daemon 22 controls the state of configuration for each engine instance 21, and engine configuration can be controlled centrally via the administrative interface of the broker, it is easy to control and configure engine instances across the computing resource grid.

Engines can be configured to run in a variety of modes, depending upon the type of host machines 23 on which they will be installed. Dedicated machines are configure to run continuously, and are best suited for computing resources devoted to full-time processing on the grid. A non-dedicated mode may be enabled for host machines that are only used on a part-time basis on the grid, and otherwise used for other purposes (for example, user PCs sometimes made unavailable to the grid for user process use).

Engines configured in the non-dedicated mode determine when to run based on two different modes. In the user interface (UI) idle mode, a non-dedicated engine will start running after user inactivity on the host machine. Alternatively, in CPU idle mode, the engine will start to run when CPU utilization is sufficiently low. Engines are installed only once on a host machine. As engines are centrally managed by an engine daemon 22, they can be easily upgraded when later versions to the AVP platform 100 are available by using the administrative interface. In addition, to gain additional efficiencies, configuration profiles may be created by the administrative interface which may be used by multiple host machines to synchronize configurations.

Figure 6B:
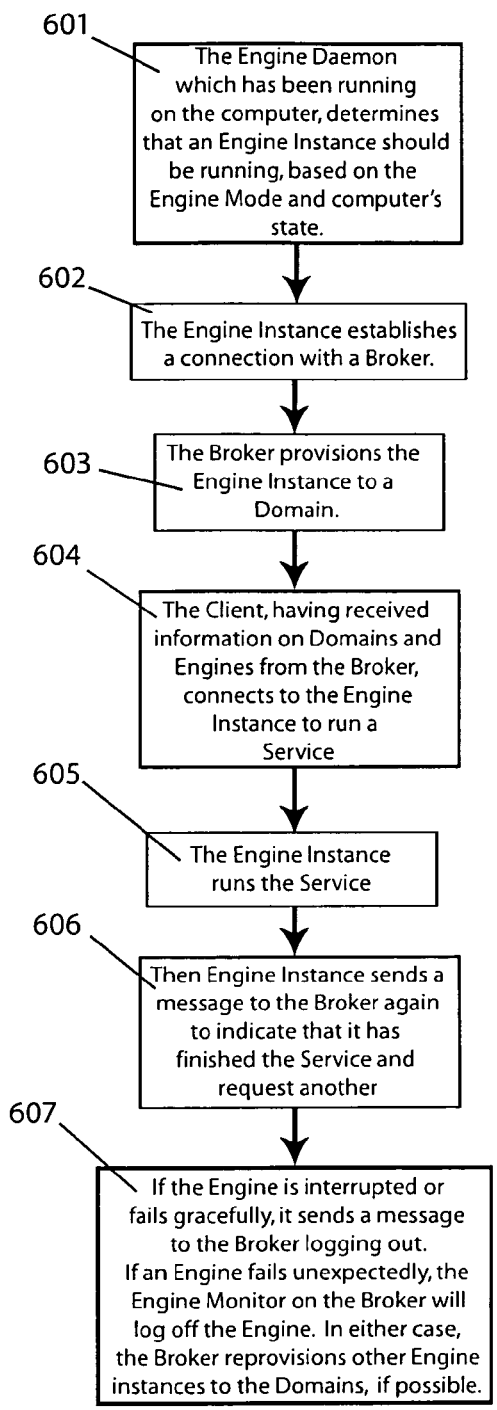
FIG. 6B provides flowcharts illustrating the steps for executing an engine lifecycle.

FIG. 6B provides a flow diagram illustrating steps in the lifecycle of and engine. At step 601, the engine daemon 22 determines that an engine instance should be running on the host 23 based on a state of the host 23 and an engine mode of the host (for example, if the engine is non-dedicated, an engine instance may be created only if no other user processes are currently running on the host 23). At step 602, the engine instance 21 established a connection to the broker 30 to identify to the broker 30 that the instance 21 is ready for work. At step 603, the broker 30 provisions the engine instance 21 to a domain.

At step 604, a client, having received information relating to the engine instance 21 and its associated domain from the broker 30, connects to the engine instance to run a service. At step 605, when the service has completed, the engine instance establishes another connection to the broker 30 to indicate that it has completed the service and to request another assignment.

At step 607, if the engine instance 21 is interrupted or otherwise fails gracefully, it connects to the broker 30 to send a message indicating that it has logged out. Otherwise, if the engine instance 21 fails unexpectedly, an engine monitor of the broker will log the engine instance off. In either case, if available, the broker will provision anther engine instance to the associated domain to replace the failed instance.

Clients

As illustrated in FIG. 1A, requests for access to service domains 40 may be forwarded to the broker 30 by Java clients 10a. The clients 10a for example may make a request to invoke a method for processing in a service domain using simple application programming interface (API) access. In the case of web domains, a web client 10b (for example, a web browser or other http client) may access a web application or web service via Vgateway 31. In this case, the client simply opens a uniform resource locator (URL) that is directed to Vgateway 31, and configured to run the selected application, virtualized on a web domain.

Figure 7A:
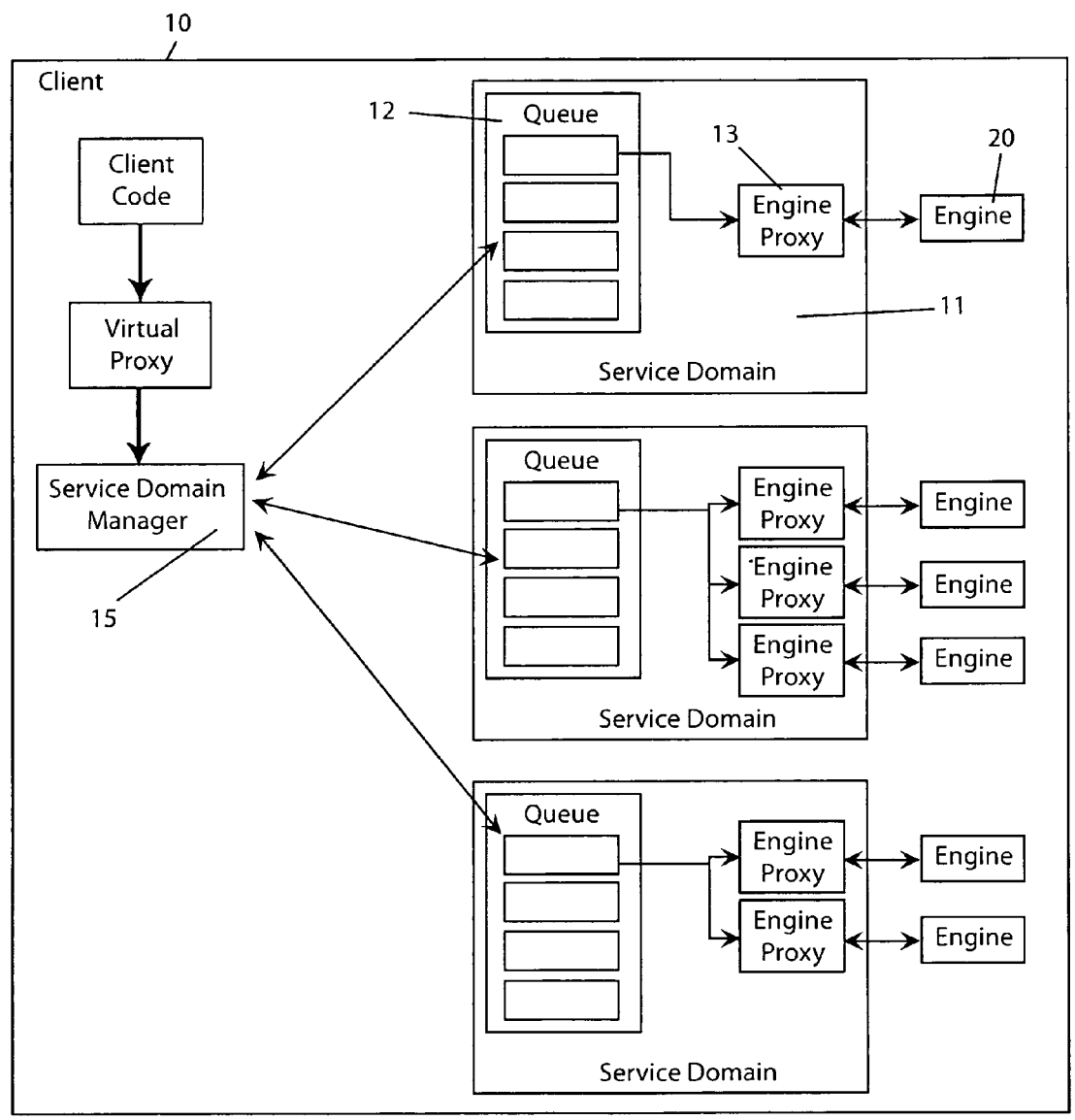
FIG. 7A provides a schematic diagram illustrating elements implementing a client component of the present invention FIG. 7B provides a schematic diagram illustrating the creation of threads on an engine as managed by the client of FIG. 7A.

As illustrated for example in FIG. 7A, a client 10 synchronously invokes a method for processing in a service domain by sending an invocation message including service/method call information and a wait lock to a corresponding service domain 11. The service domain 11 adds the message to an invocation queue 12. A thread running on the engine 20 is then blocked by the service domain 11 using the wait lock. The process for asynchronous invocation is similar, except a result listener message is sent in the invocation message, indicating that a listening process will be created by the client and wait until the engine 20 indicates that the task has been completed.

Figure 7B:
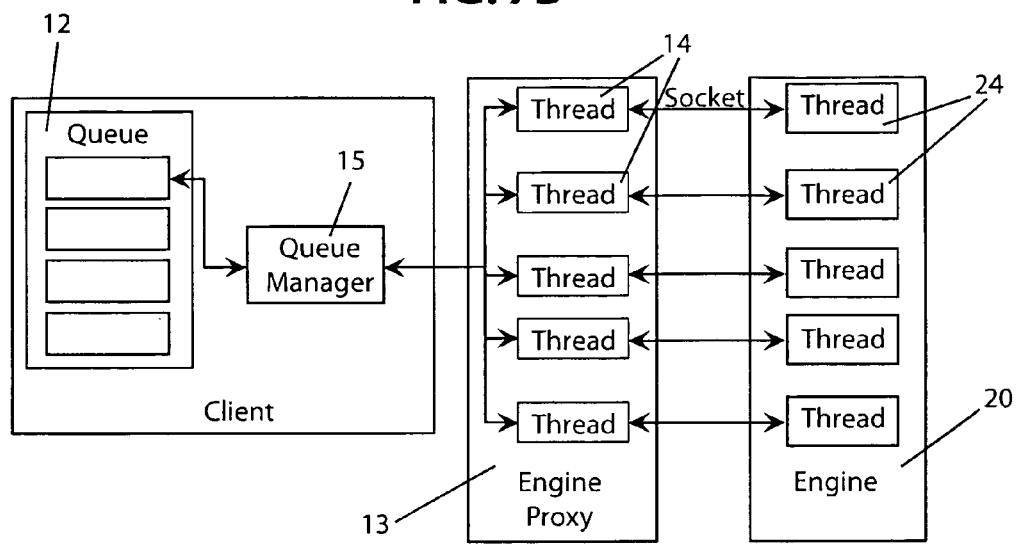

Communications between the engine 20 and the client 10 are managed by an engine proxy 13. As illustrated in FIG. 7B, the engine proxy 13 creates a new thread 14 for each thread 24 that has been started on the engine 20. With these threads, the proxy 13 continuously asks for a next invocation process. The threads 14 will block if the queue 12 is empty. If the proxy 13 fails to process an invocation, it notifies the queue manager 16, which places the unprocessed invocation back in the queue 12.

Each client 10 has a performance monitor (not shown) for monitoring call requests and keeping statistics on recent history. Request statistics monitored by the client 10 preferably include but are not necessarily limited to total response time, time in the queue 12, time in transport and time in user code (i.e., direct application or service processing time). The client monitor calculates average statistics for each of the measured statistics, as well as average throughput. The average statistics are periodically sent by the client 10 to the broker 30, as further described herein.

Broker

The broker 30 provides policy-driven resource allocation and monitoring for the AVP platform 100. Specific broker tasks include message routing and client authentication, engine allocation, engine provisioning and resource management, performance monitoring, and application and application server code distribution. Engines and clients are able to log in to the broker 30 in support of these tasks.

Figure 8A:
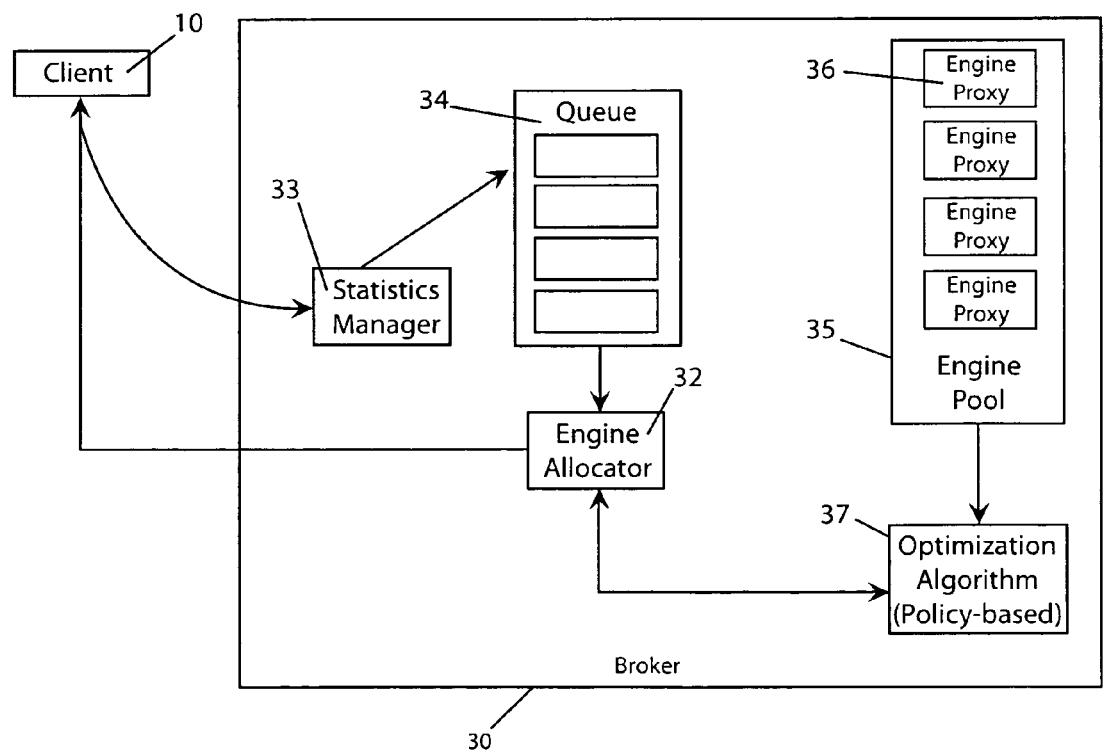
FIG. 8A provides a schematic diagram illustrating broker-initiated provisioning of engines dedicated to clients.

FIG. 8A schematically illustrates a broker-driven process by which engines are allocated to domains. Client 10 periodically sends average statistics to broker 30, which are received by statistics manager 33 and placed in client and engine statistics queues 34. Engine allocator 32 scans client and engine statistics queues at regular intervals, applies policy-based optimization algorithm 37, and decides either to make no changes to the current allocation of engines to clients 10, to assign currently available engines from engine pool 35 to some of the clients 10, and/or to re-assign some engines previously assigned to clients 10 to other clients. Clients 10 are provided access to engines in engine pool 35 with the delivery of associated engine proxies 36 from the broker 30 to the clients 10.

The broker 30 provisions engines according to the service policy based on the operational mode of the broker, allocation policies and client activity. Schemas include "broker-initiated" provisioning and "client-initiated" provisioning). Broker-based provisioning is useful for controlling engine allocation across domains, and is required to enable engine sharing.

Figure 8B:
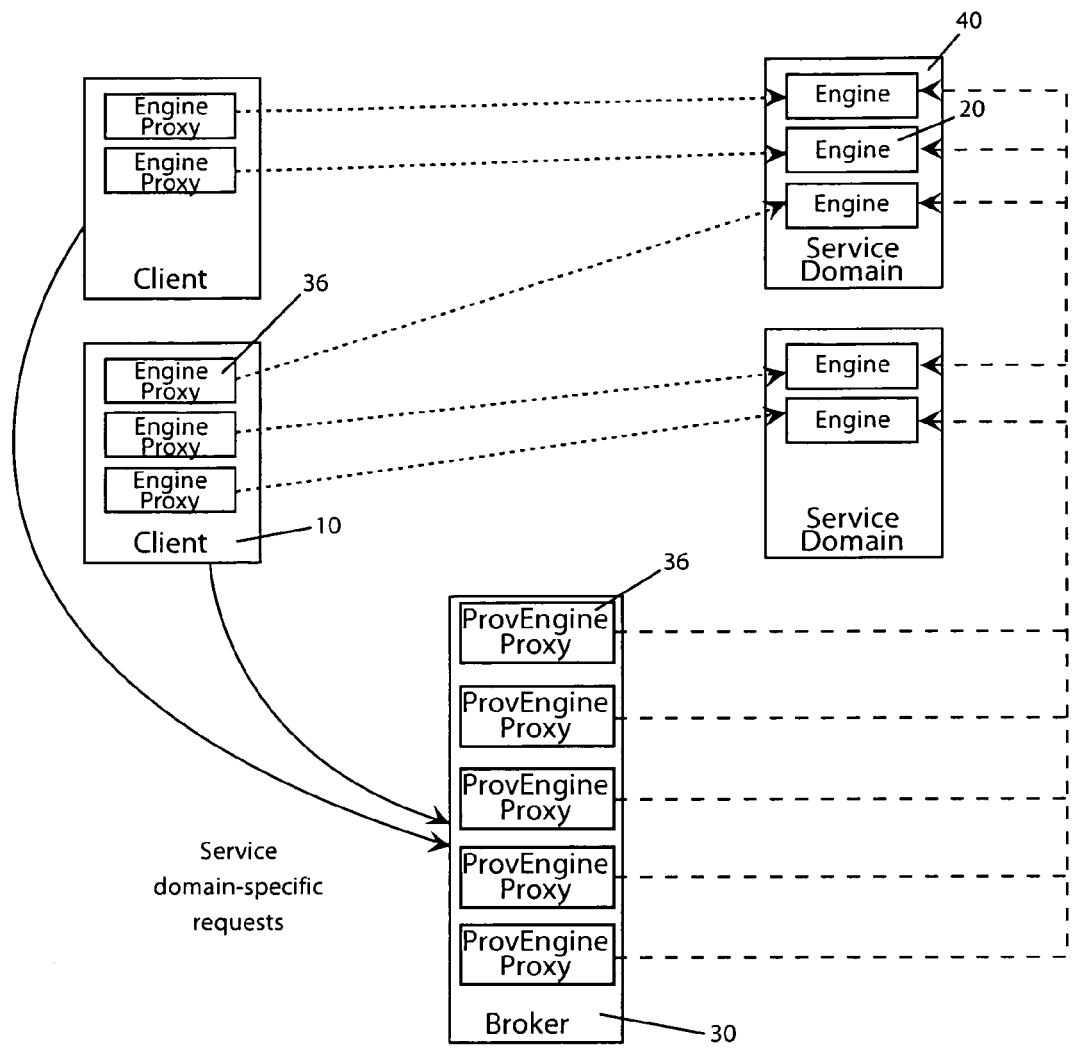
FIGS. 8B and 8C provide schematic diagrams illustrating broker-initiated provisioning of engines shared by clients.

As illustrated in FIG. 8B, broker-based provisioning begins with a service domain-specific request transmitted by a client 10 to the broker 30. In response, the broker provides the client with an engine proxy that is already assigned to a specific service domain. With broker-based provisioning, a client may not directly ask the engine to change the assigned domain.

Figure 8C:
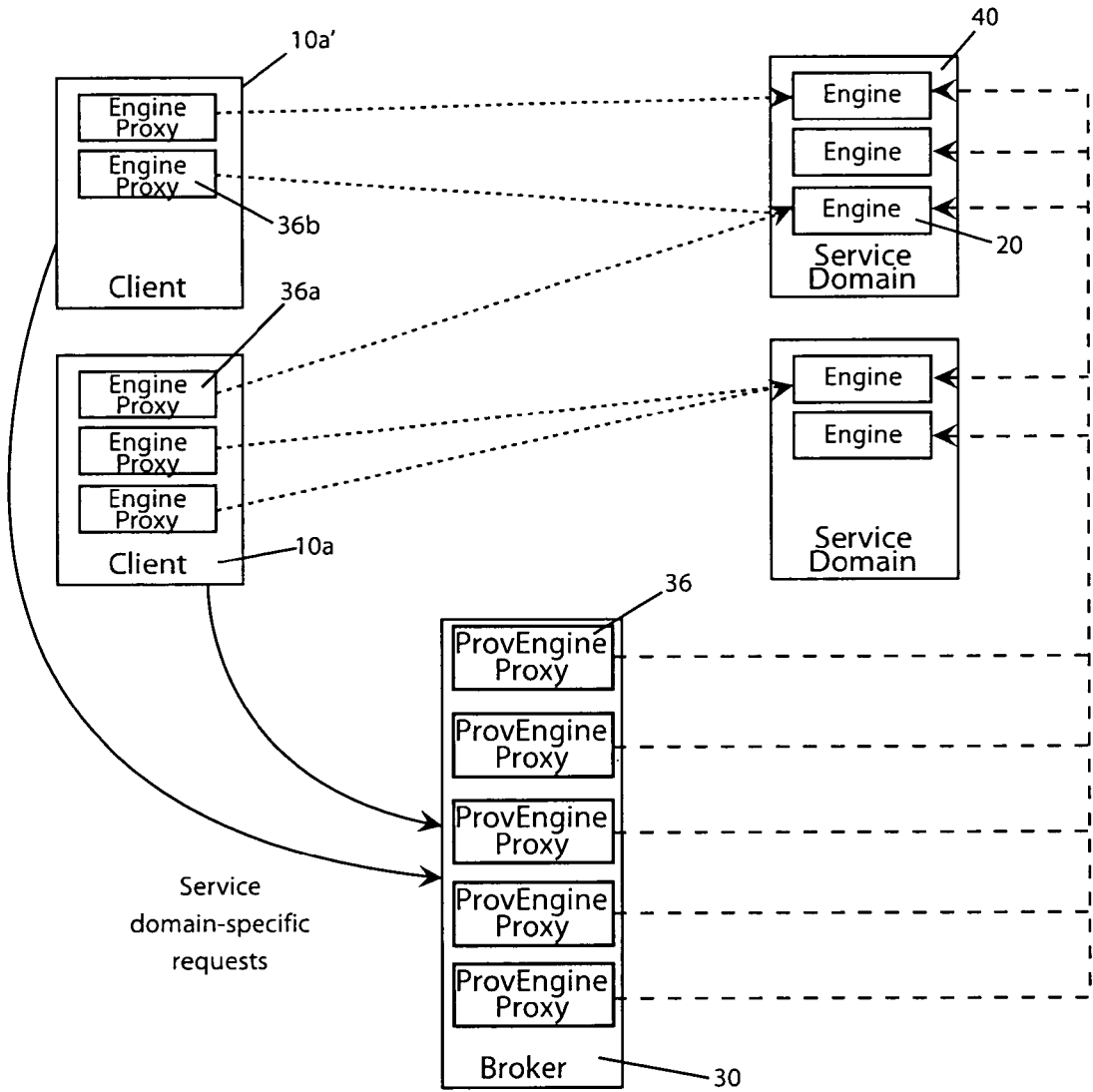

Two kinds of engine allocation are supported by broker-based provisioning. With exclusive allocation, as illustrated in FIG. 8B, engines are assigned with the delivery of associated engine proxies 36 to clients 10 such that each engine 20 provisioned in a domain 40 is assigned to perform work for exactly one client 10. With shared allocation, as illustrated in FIG. 8C, two or more clients 10a, 10a' may respectively use shared engine proxies 36a, 36b to send requests to the same engine 20 in domain 40.

Figure 8D:
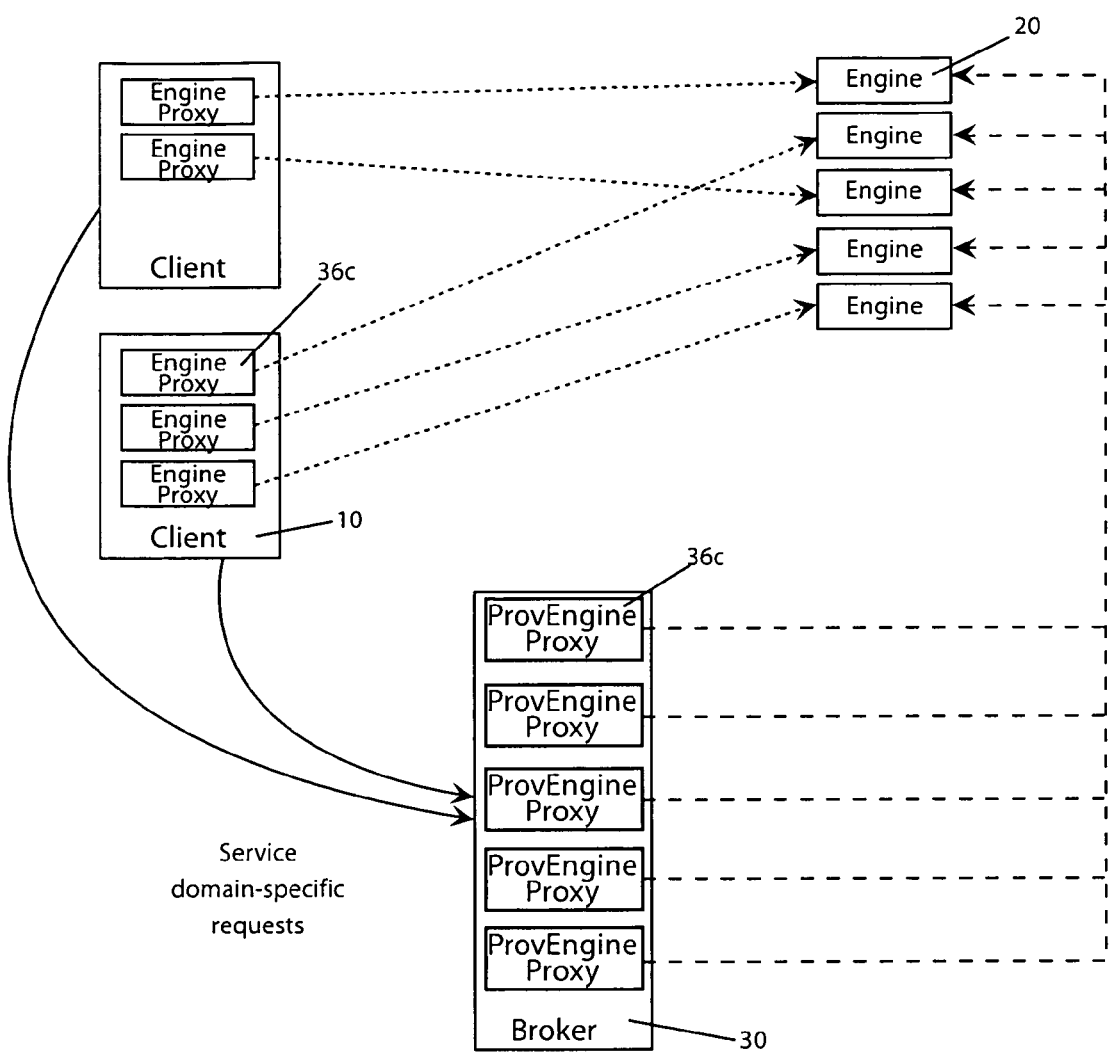
FIG. 8D provides a schematic diagram illustrating client-initiated provisioning of engines.

As illustrated in FIG. 8D, under the client-initiated provisioning schema, clients 10 receive "blank slate" engine proxies 36c, and are able to provision them with service domains of their choice. A service domain-independent request is first transmitted by the client 10 to the broker 30. In response, the broker 30 provides the client with unassigned proxy 36c, allowing the client to activate a service domain of its choice via engine 20. Under this schema, no sharing of engines is possible.

The broker performs a number of additional functions on behalf of the AVP platform 100. For example, the broker configures and stores a variety of operational settings and parameters, including but not necessarily limited to user identification, passwords, client information, routing properties and engine configuration. Using this stored data, for example, associated tasks may be carried out by platform administrators via the administrative interface of the broker 30.

An internal database of the broker stores reporting data, including for example user, engine, client and broker information, and an external reporting database is used to log events and performance statistics. Associated database configurations may be managed by platform administrators via the administrative interface.

Domain resources are staged on the broker 30, for deployment to engines. For example, files may be uploaded to deploy service, web and data domains using the domain wizard component of the administrative interface as illustrated in FIG. 2. Domains can be deployed at the time of uploading, or can be deployed or undeployed at a later time.

Monitoring and Statistics Tracking

Figure 9A:
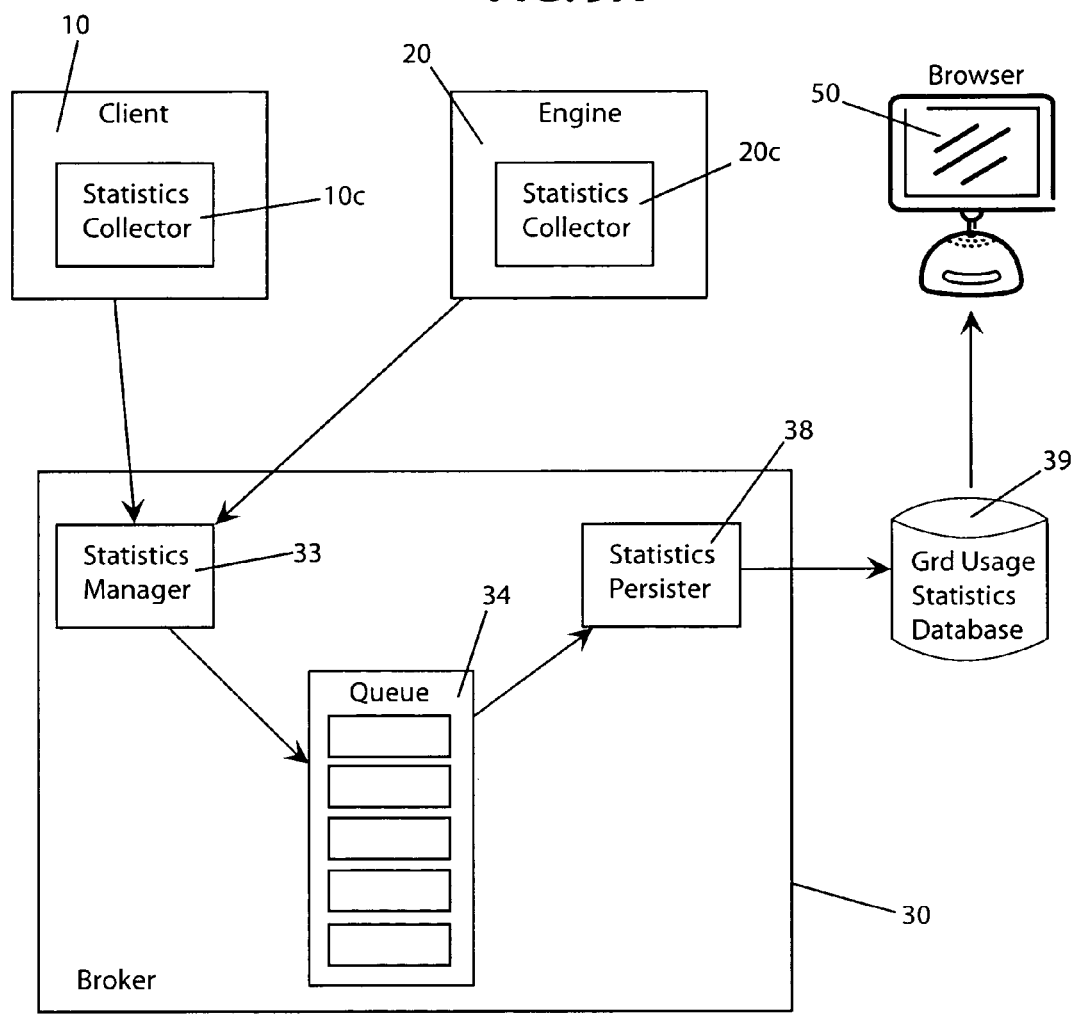
FIG. 9A provides a schematic diagram illustrating how performance statistics are compiled by the broker.

The broker 30 carries out a performance monitoring function with the assistance of the clients 10 and engines 20. FIG. 9A schematically illustrates how the function is performed.

At regular intervals, the broker 30 asks at least one of each client 10 and engine 20 associated with service and web domains (preferably, at least each engine 20) to collect and forward averaged performance statistics. The information is collected and forwarded by at least one of a statistics collector 10c of the client 10 and a statistics collector 20c of the engine 20 to the statistics manager 33 of the broker 30. This process may for example be facilitated by means of a JMX proxy for clients and engines running J2EE applications.

FIG. 9B further illustrates schematically how statistics are collected by the client 10 and engine 20. The statistics collectors 10c, 20c of the client 10 and engine 20 hold a collection of statistics providers 60. At regular intervals, the statistics collector 10c, 20c asks each provider 60 to format its latest average statistics into a common statistics record 61, and forwards the common statistics records 61 to the statistics manager 33 of the broker 30 as illustrated in FIG. 9A. The forwarded information includes an invoking group, domain, service and method "signature," as well as the average values of collected statistics.

The statistics manager 33 places the forwarded information in client and engine statistics queues 34 of FIG. 9A. Periodically (for example, hourly), statistics persister 38 consolidates the collected data by averaging the accumulated data for each client 10 and engine 20, calculating statistics for the entire computing resource grid, and storing the calculated statistics in grid usage statistics database 39. Additional averaging and archiving is preferably performed periodically on the database 39 to further consolidate the data. The accumulated data in the database 39 may be displayed on a reporting screen 50 via the AVP platform administrative interface.

A sample list of statistics tracked is provided in FIGS. 9C and 9D. Statistics used will vary according to application. For example, load on a JAVA application serve may be assessed by statistics such as queue depth, service throughput or thread count rather than user response time.

With frequent collection of statistics from each client 10 and engine 20, large amounts of statistical data accumulate. Accordingly, at frequent intervals, the broker operates to average the data collected for each client and engine, to calculate statistics for the entire grid, and to save the resulting records in the broker databases. Archiving may be performed after successive intervals, using similar averaging methods.

The collected statistics may be viewed in a variety of ways via tracking tools in the administrative interface of the broker 30. As illustrated in FIG. 9E, for example, the administrative interface may include a dashboard for displaying a variety of statistical data in summary form. The dashboard may provide, for example, pie charts indicating domain and group allocations of engines, measured statistics for the clients and engines, and platform alerts generated according to a comparison of the measured statistics to service level agreements (SLAs) defined in the service-level policies. In addition, the dashboard may provide links for viewing domains, wizards for configuring various components of the platform, and links to other frequently used pages of the administrative interface.

Figure 9F:
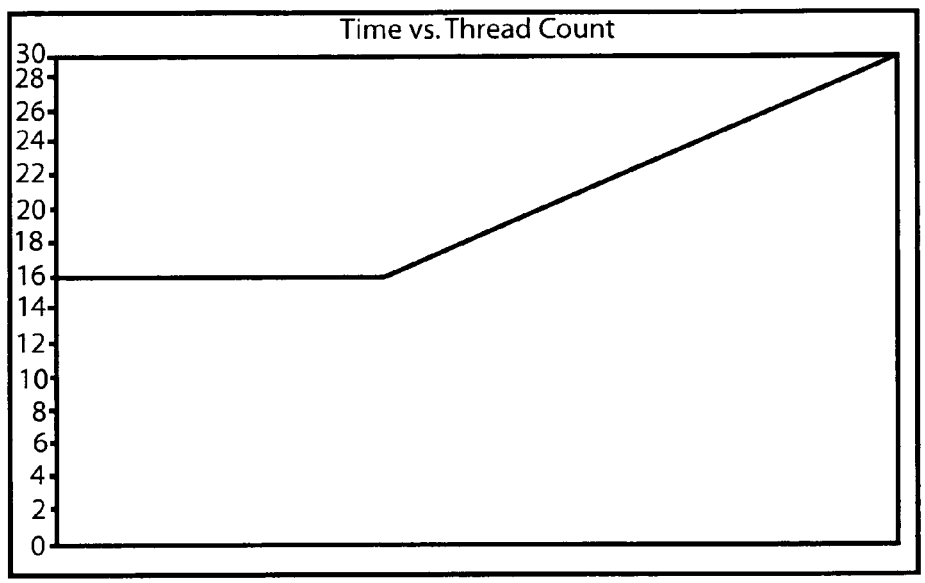
FIG. 9F illustrates an exemplary web page reporting a measured statistic for an engine.

For example, as illustrated in FIG. 9F, a web page of the administrative interface illustrates a thread count over time for a selected engine.

Adaptive Provisioning

Figure 10:
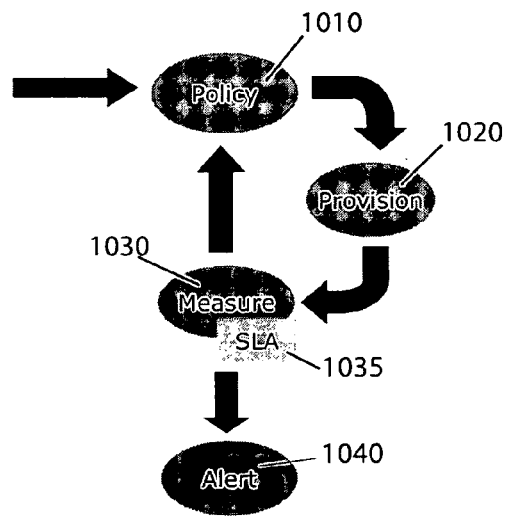
FIG. 10 presents a flow diagram illustrating an adaptive provisioning process according to the present invention.

FIG. 10 summarizes the adaptive provisioning process according to the present invention. As described above, at step 1010, a service-level policy is defined and stored in a database 39 accessible to the broker 30. The policy includes minimum and maximum resource levels to be allocated, for example, to a domain or user group, by time of day. The policy may also include priority weights to be applied in the event of resource contention, and service-level policies relating to measured statistics for the system.

At step 1020, the resources are provisioned according to the policy. Engines are assigned to domains by the broker 30, and configured by downloading and installing associated application server and application software in the engines. Once configured, engine instances are also started in response to the receipt of service requests, and stopped upon task completion.

At step 1030, the broker 30 periodically collects averaged performance statistics from one or more of the clients and the engines, and compares the averaged statistics with service-level agreements (SLAs) 1035 defined in service-level policies. The statistics may provide measures of throughput, response time, CPU occupancy, memory occupancy and other attributes that may for example be defined as JMX attributes. In the event that SLAs are not being met, the policy is again applied at step 1010 and the resources are reallocated at step 1020. In addition, at step 1040, alerts indicating violation of the SLAs may preferably be reported to administrators via a "dashboard" of the administrative interface of the broker 30.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

All references, publications, pending and issued patents are herein each incorporated by reference in their entirety.

What is claimed as new and desired to be protected by Letters Patent of the United States is:

1. A system for provisioning a shared computing infrastructure that supports a plurality of software applications and a plurality of types of software application servers, each type of software applications server creating a run-time environment for executing at least one of the plurality of software applications on a grid of computing resources, the system comprising:
    at least one grid node, each grid node comprising at least one host computer;
    a first type of software application server and a second type of software application server, wherein the first and second types of software application servers are software programs and are of different types;
    two or more computing engines each assigned to execute an instance of one of the plurality of software applications in a run-time environment created by one of the plurality of types of software application servers on the at least one host computer of the at least one grid node;
    two or more clients each accessing one of the two or more computing engines to execute the software application assigned to the one computing engine;
    and a broker including:
    an optimization module for periodically determining an optimal allocation of the plurality of software applications and software application servers among the two or more computing engines;
    and a configuration manager, responsive to the determinations by the optimization module, for instructing one of the two or more computing engines to reconfigure its run-time environment, the configuration manager instructions causing a given computing engine to reconfigure by halting a current instance of a software application of a first type executing in a run-time environment created by the software application server of the first type, and by loading and starting an instance of a software application of a second type within a run-time environment created by the software application server of the second type on said given computing engine,
    wherein the halting is to reallocate resources based on the optimal allocation among the two or more computing engines.

2. The system of claim 1, wherein the broker further includes an engine allocation module for providing each of the two or more clients with an engine proxy for accessing its assigned computing engine.

3. The system of claim 1, further comprising:
    a router that routes service requests from the two or more clients to the two or more computing engines, the router being operative to balance at least one of a number of service requests initiated by the two or more clients and a service load resulting from the requests among the two or more computing engines.

4. The system of claim 3, wherein the broker further includes:
    a monitor for collecting statistical information from at least one of the two or more clients, the two or more engines and the router, wherein the optimization module periodically determines the optimal allocation based on the statistical information collected by the monitor and a defined policy.

5. The system of claim 4, wherein the optimization module further includes a policy manager for determining rules associated with the defined policy, and a rules engine for capturing the determined rules.

6. The system of claim 1, wherein the broker further includes a software distribution module for distributing and loading instances of the two or more software application servers and instances of the two or more software applications on ones of the two or more computing engines.

7. The system of claim 6, further comprising an archival database for storing components of the two or more software application servers and the two or more software applications for retrieval by the software distribution module.

8. The system of claim 5, further comprising an administrative interface for performing at least one function selected from the group consisting of creating and editing software applications, selecting software application servers for software applications, creating and editing policies for software applications, testing software applications and generating reports based on the statistical information.

9. A method for provisioning a shared computing infrastructure that supports a plurality of software applications and a plurality of types of software application servers among two or more clients, each type of software application server creating a run-time environment for executing at least one of the plurality of software applications on a grid of computing resources, the method comprising the steps of:
providing a broker having a CPU and at least one grid node comprising at least one host computer having a CPU and a first type of software application server and a second type of software application server, each of the first and second types of software application servers are software programs and are of different types;
using the broker, assigning a each of two or more computing engines to execute an instance of one of the plurality of software applications in a run-time environment created by one of the plurality of types of software application servers on the at least one host computer of the at least one grid node, where the two or more clients each access one of the two or more computing engines to execute the software application assigned to the respective computing engine; and
periodically determining an optimal allocation of the plurality of software applications and software application servers among the two or more computing engines using an optimization module included in the broker;
using a configuration manager included in the broker, instructing one of the two or more computing engines to reconfigure its run-time environment in response to the determinations by the optimization module, the instructing step causing a given computing engine to reconfigure by halting a current instance of a software application of a first type executing in a run-time environment created by the software application server of the first type, and by loading and starting an instance of a software application of a second type within a run-time environment created by the software application server of the second type on said given computing engine
wherein the halting is to reallocate resources based on an optimal allocation among the two or more computing engines.

10. The method of claim 9, further comprising the step of: providing at least one of the two or more clients, with an engine proxy for accessing one of the two or more computing engines.

11. The method of claim 9, further comprising the steps of:
routing service requests from the two or more clients via a gateway router to the two or more computing engines, the gateway router being operative to balance at least one of a number of service requests and a service load among the two or more computing engines.

12. The method of claim 11, further comprising the steps of collecting statistical information from at least one of the two or more clients, the two or more engines and the router, and
periodically determining the optimal allocation of the plurality of software applications and software application servers among the two or more computing engines, based on the collected statistical information and a defined policy.

13. The method of claim 12, wherein the defined policy includes at least one of a minimum number of the two or more computing engines to be assigned to one of the plurality of software applications and a maximum number of the two or more computing engines to be assigned to one of the plurality of software applications.

14. The method of claim 13, wherein the defined policy includes a policy schedule having one or more time of day policies.

15. The method of claim 9, further comprising the steps of:
storing components of the two or more software application servers and the plurality of software applications in an archival database;
retrieving components from the archive database that define the software group consisting of service domains, web domains and data domains, the software application of the second type and the software application server of the second type, the retrieved components to be loaded by the one or more computing engines; and
registering the software application of the second type and the software application serve of the second type in association with a domain.

16. The method of claim 15, wherein the domain has a domain type selected from the group consisting of service domains, web domains and data domains.

17. The system of claim 4, wherein the optimization module determines the optimal allocation based further on priorities assigned to each of the plurality of software applications.

18. The method of claim 12, wherein the optimal allocation is further based further on priorities assigned to each of the plurality of software applications.

* * * * *